United States Patent
Yoshigae

(10) Patent No.: US 8,432,585 B2
(45) Date of Patent: Apr. 30, 2013

(54) IMAGE READING DEVICE, IMAGE READING METHOD, AND IMAGE FORMING APPARATUS INCLUDING THE IMAGE READING DEVICE

(75) Inventor: Takahisa Yoshigae, Kawasaki (JP)

(73) Assignee: Ricoh Company, Limited, Tokyo (JP)

( * ) Notice: Subject to any disclaimer, the term of this patent is extended or adjusted under 35 U.S.C. 154(b) by 1107 days.

(21) Appl. No.: 12/388,853

(22) Filed: Feb. 19, 2009

(65) Prior Publication Data
US 2009/0213442 A1 Aug. 27, 2009

(30) Foreign Application Priority Data
Feb. 26, 2008 (JP) ................... 2008-044727

(51) Int. Cl.
*H04N 1/04* (2006.01)
(52) U.S. Cl.
USPC ........... 358/497; 358/1.13; 358/505; 713/300
(58) Field of Classification Search .................. 358/1.13, 358/497, 505; 713/300
See application file for complete search history.

(56) References Cited

U.S. PATENT DOCUMENTS

| | | | |
|---|---|---|---|
| 6,564,028 B2 | 5/2003 | Kanno | |
| 6,963,430 B2 * | 11/2005 | Matsui | 358/486 |
| 7,782,498 B2 * | 8/2010 | Hoshi | 358/474 |
| 2002/0186426 A1 | 12/2002 | Sakai | |
| 2005/0152007 A1 * | 7/2005 | Cunnagin et al. | 358/474 |
| 2005/0206976 A1 | 9/2005 | Hakamada | |
| 2007/0242155 A1 | 10/2007 | Yoshigae | |

FOREIGN PATENT DOCUMENTS

| | | |
|---|---|---|
| EP | 1 261 193 A1 | 11/2002 |
| EP | 1 261 193 B1 | 11/2002 |
| EP | 1 608 145 A3 | 12/2005 |
| EP | 1 816 847 A3 | 8/2007 |
| JP | 2002-112027 | 4/2002 |
| JP | 2002-118726 | 4/2002 |
| JP | 2008-17128 | 1/2008 |

OTHER PUBLICATIONS

European Patent Office Search Report (EP 09 25 0407) dated May 25, 2009.

* cited by examiner

*Primary Examiner* — King Poon
*Assistant Examiner* — Lawrence Wills
(74) *Attorney, Agent, or Firm* — Oblon, Spivak, McClelland, Maier & Neustadt, L.L.P.

(57) ABSTRACT

An image reading device including a first carriage including optical elements; a second carriage including optical elements; a carriage driving unit including a pulse motor to move the first and second carriages; a home position sensor to detect a home position of the first carriage; a reference whiteboard to generate shading data and adjust a reference level to be read by the optical elements; a control unit to control the above-described components to read an image of a document through the optical elements; and a counter to count a pulse of a pulse signal driving the pulse motor. The control unit switches directions of movement of the first carriage based on a result output from the home position sensor when the image reading device is returned to an active mode from an energy-saving mode, and detects a distance of movement of the first carriage based on the pulse.

20 Claims, 5 Drawing Sheets

IMAGE READING DEVICE, IMAGE READING METHOD, AND IMAGE FORMING APPARATUS INCLUDING THE IMAGE READING DEVICE

CROSS-REFERENCE TO RELATED APPLICATIONS

The present patent application is based on and claims priority pursuant to 35 U.S.C. §119 from Japanese Patent Application No. 2008-044727, filed on Feb. 26, 2008 in the Japan Patent Office, the entire contents of which are incorporated herein by reference.

BACKGROUND OF THE INVENTION

1. Field of the Invention

Exemplary aspects of the present invention generally relate to an image reading device to read image data from an original document placed on a document stand by scanning it using a carriage driven by a pulse motor, an image reading method, and an image forming apparatus including the image reading device.

2. Description of the Background

There is increasing demand for a shorter wake-up time from a standby mode to an active mode as well as higher processing speed for image reading devices (such as scanners) included in image forming apparatuses such as copiers and digital multifunction printers.

When not in operation, the image reading device is generally either in a power-off mode, in which all power supply is turned off, or in an energy-saving mode, in which power is only partially supplied. Specifically, the image reading device enters the power-off mode when a main power source is turned off to shut down the image reading device. By contrast, the image reading device enters the energy-saving mode when a next operation is not performed for a certain period of time after completion of the previous operation. During the energy-saving mode, minimum power is supplied to a minimum number of units to operate a control circuit, and no power is supplied to the rest of the units. A shorter wake-up time is especially required when the image reading device is returned to the active mode from the energy-saving mode. How this shorter wake-up time is accomplished requires a detailed discussion of the structure and operation of a typical image reading device, provided below.

The image reading device typically includes a lamp, a reflector, a first carriage including a first mirror, a second carriage including second and third mirrors, a home position sensor to detect whether or not the first carriage is positioned at a home position, a contact glass on which an original document is to be placed, a reference whiteboard used for generating shading data and adjusting a reference level, optical elements such as a lens and a CCD, a motor for moving the first and second carriages, and so forth. The first and second carriages are moved in a sub-scanning direction to read data on the reference whiteboard and the original document. When not scanning, the first and second carriages stay at the home position.

FIG. 1A is a top view illustrating a related-art image reading device. FIG. 1B is a front view illustrating the related-art image reading device illustrated in FIG. 1A in which first and second carriages are positioned at a home position. FIG. 1C is a view illustrating a detection result output from a home position sensor in which a sub-scanning direction of the carriages is represented by a horizontal axis.

Referring to FIGS. 1A and 1B, an image reading device 1 includes a document stand 2, a contact glass, not shown, provided to the document stand 2, and a reference whiteboard 3 provided on a bottom surface of the document stand 2. The reference whiteboard 3 is provided upstream from the contact glass relative to a direction of movement of a carriage assembly. The carriage assembly includes a first carriage 4 and a second carriage 5. The first carriage 4 includes a lamp 6 serving as an illumination light source, and a first mirror 7 to reflect light reflected from an original document. The second carriage 5 includes second and third mirrors 8 and 9 to direct the light reflected from the first mirror 7 to an imaging lens 10. The first and second carriages 4 and 5 are moved at a speed ratio of 2 to 1, and a distance from the first and second carriages 4 and 5 to a CCD 11 is set to be constant. The CCD 11 reads an image of the original document, and is provided on a sensor board 12. The image of the original document formed by the imaging lens 10 is focused on an imaging surface of the CCD 11 and read by the CCD 11. At this time, data on the reference whiteboard 3 and the original document are read as image data. The first and second carriages 4 and 5 are positioned at a home position 13 when not scanning. The home position 13 is located a certain distance apart from where a home position sensor 14 is switched from OFF to ON when detecting that the first carriage 4 passes the home position sensor 14.

It should be noted that the lamp 6, the first mirror 7, and the second and third mirrors 8 and 9 hereinafter serve as optical elements. The first and second carriages 4 and 5 are moved by a driving force transmission mechanism, not shown, including a pulse motor.

FIG. 2 is a flowchart illustrating a process to return the image reading device 1 from the power-off mode or the energy-saving mode to the active mode. In the image reading device 1 of the related-art, the same process is performed to return the image reading device 1 from the power-off mode and the energy-saving mode to the active mode. Specifically, at S401, integrated circuits (ICs) are initialized to return the image reading device 1 from the power-off mode or the energy-saving mode to the active mode. At S402, the lamp 6 is turned on, and homing is performed at S403. It should be noted that the term "homing" as used in this specification includes relocation of the first carriage 4 at the home position 13. Homing includes two different processes depending on a state of the home position sensor 14 before homing, as described below.

In a case in which the home position sensor 14 is switched ON before homing, the first carriage 4 is moved to a position where the home position sensor 14 is switched OFF. Subsequently, a direction of movement of the first carriage 4 is reversed when the home position sensor 14 is switched OFF, and moved until the home position sensor 14 is switched ON. A pulse is counted from the position where the home position sensor 14 is switched ON from OFF to place the carriage 4 at the home position 13.

By contrast, in a case in which the home position sensor 14 is switched OFF before homing, the first carriage 4 is moved in a direction such that the home position sensor 14 is switched ON. A pulse is counted from the position where the home position sensor 14 is switched ON from OFF to place the carriage 4 at the home position 13.

After homing, at S404, the first carriage 4 is moved under the reference whiteboard 3 from the home position 13 to start initialization. At S405, initialization is performed to initialize the ICs and adjust gain and offset values. At S406, the adjusted gain value and a black level are confirmed and the first carriage 4 is moved to the home position 13. At S407, the lamp 6 is turned off, and the image reading device 1 is now in the active mode and ready to start reading images.

In the above-described image reading device 1, the motor for driving the first carriage 4 is not activated during the power-off mode and the energy-saving mode. Consequently, the first carriage 4 may be moved from the home position 13 due to vibration applied while, for example, in transit. As a result, homing is required to be performed to move the first carriage 4 to the home position 13 when the image reading device 1 is returned to the active mode. However, because a moving speed of the first carriage 4 during homing is constant and slow, a longer time is required to complete homing.

Generally speaking, because a main power source is turned off, the image reading device 1 does not enter the energy-saving mode while in transit. Therefore, it is assumed that the first carriage 4 does not move much from the home position 13 during the energy-saving mode due to vibration. However, during the energy-saving mode, the first carriage 4 is likely to be positioned where it is positioned immediately before the image reading device 1 enters the energy-saving mode. Consequently, homing is still required to be performed when the image reading device 1 is returned from the energy-saving mode to the active mode.

Although techniques to reduce the time required to restart the image reading device from shut down have been disclosed, those techniques are not effective to reduce the time required to return the image reading device from the energy-saving mode to the active mode.

SUMMARY

In view of the foregoing, illustrative embodiments of the present invention provide an image reading device capable of returning to an active mode from an energy-saving mode within a shorter time, an image reading method, and an image forming apparatus including the image reading device.

In one illustrative embodiment, an image reading device includes a first carriage including optical elements for reading an image of a document; a second carriage including optical elements for reading the image of the document; a carriage driving unit including a pulse motor to move the first and second carriages; a home position sensor to detect a home position of the first carriage; a reference whiteboard to generate shading data and adjust a reference level to be read by the optical elements; a control unit to control the first and second carriages, the carriage driving unit, the home position sensor, and the reference whiteboard to read the image of the document placed on a contact glass through the optical elements; and a counter to count a pulse of a pulse signal driving the pulse motor. The control unit switches directions of movement of the first carriage based on a result output from the home position sensor when the image reading device is returned to an active mode from an energy-saving mode, and detects a distance of movement of the first carriage based on the pulse counted by the counter.

Another illustrative embodiment provides an image forming apparatus including the image reading device described above, and an image forming device to form an image on a recording medium based on an image read by the image reading device.

Yet another illustrative embodiment provides an image reading method for an image reading device. The device includes a first carriage and a second carriage, each carriage containing optical elements for reading an image of a document; a carriage driving unit including a pulse motor to move the first and second carriages; a home position sensor to detect a home position of the first carriage; a reference whiteboard to generate shading data and adjust a reference level to be read by the optical elements; a control unit to control the first and second carriages, the carriage driving unit, the home position sensor, and the reference whiteboard to read the image of the document placed on a contact glass through the optical elements; and a counter to count a pulse of a pulse signal driving the pulse motor. The method includes switching directions of movement of the first carriage based on a result output from the home position sensor when the image reading device is returned to an active mode from an energy-saving mode, and detecting a distance of movement of the first carriage based on the pulse counted by the counter.

Yet another illustrative embodiment provides an image reading device including a first carriage including optical elements for reading an image of a document; a second carriage including optical elements for reading the image of the document; carriage driving means for moving the first and second carriages; home position sensing means for detecting a home position of the first carriage; a reference whiteboard for generating shading data and adjusting a reference level to be read by the optical elements; control means for controlling the first and second carriages, the carriage driving means, the home position sensing means, and the reference whiteboard to read the image of the document placed on a contact glass through the optical elements; and counting means for counting a pulse of a pulse signal. The control means switches directions of movement of the first carriage based on a result output from the home position sensing means when the image reading device is returned to an active mode from an energy-saving mode, and detects a distance of movement of the first carriage based on the pulse counted by the counting means.

Additional features and advantages of the present invention will be more fully apparent from the following detailed description of illustrative embodiments, the accompanying drawings, and the associated claims.

BRIEF DESCRIPTION OF THE DRAWINGS

A more complete appreciation of the disclosure and many of the attendant advantages thereof will be readily obtained as the same becomes better understood by reference to the following detailed description of illustrative embodiments when considered in connection with the accompanying drawings, wherein.

DETAILED DESCRIPTION OF ILLUSTRATIVE EMBODIMENTS

Figure 1A:
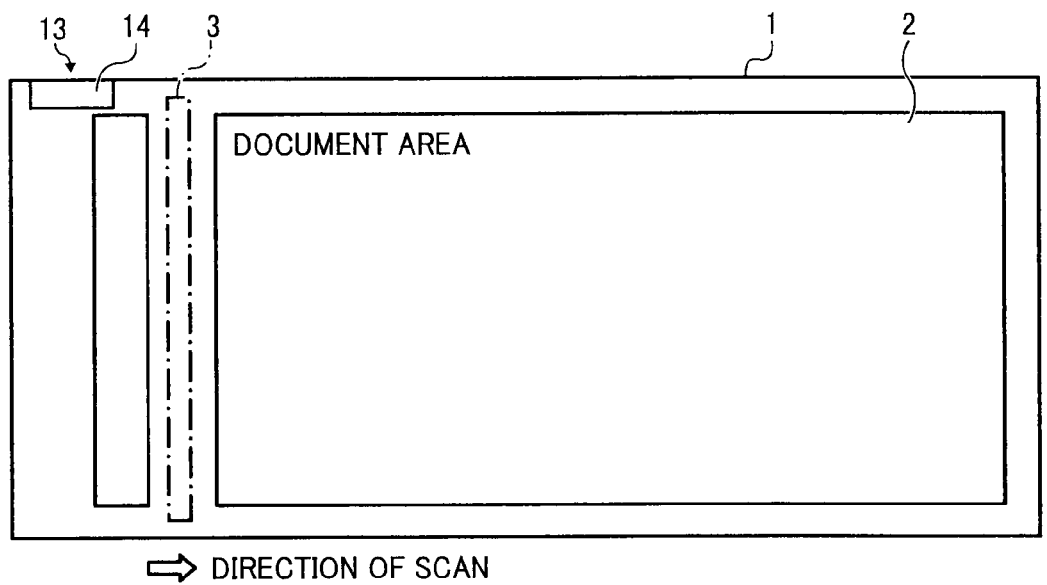
FIG. 1A is a top view illustrating a related-art image reading device.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Illustrative embodiments of the present invention are now described below with reference to the accompanying drawings.

In a later-described comparative example, illustrative embodiment, and exemplary variation, for the sake of simplicity the same reference numerals are given to identical constituent elements such as parts and materials having the same functions, and redundant descriptions thereof omitted unless otherwise required.

Figure 1B:
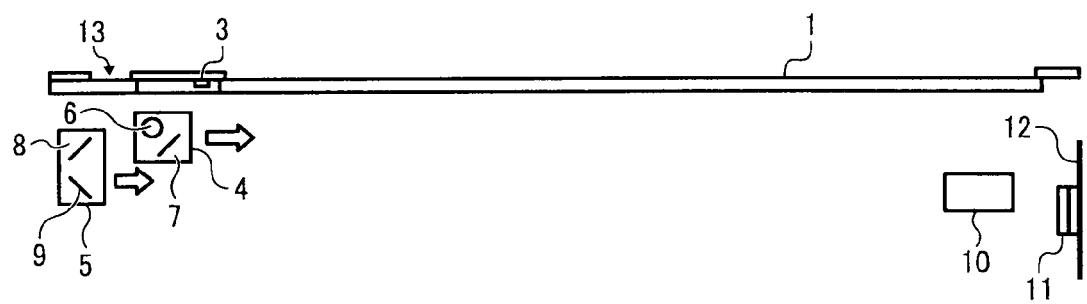
FIG. 1B is a front view illustrating the related-art image reading device illustrated in FIG. 1A.
Figure 1C:
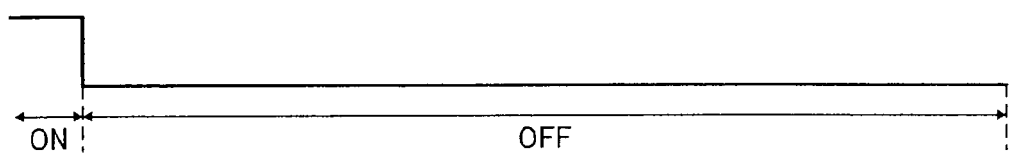
FIG. 1C is a view illustrating a detection result output from a home position sensor in which a sub-scanning direction of carriages is represented by a horizontal axis.

It should be noted that an image reading device according to illustrative embodiments to be described in detail below includes a configuration substantially similar to that of the image reading device 1 illustrated in FIG. 1. Therefore, the same reference numerals as those used in FIG. 1 are assigned to the similar components in the image reading device according to illustrative embodiments, and detailed explanation thereof is omitted.

Figure 3:
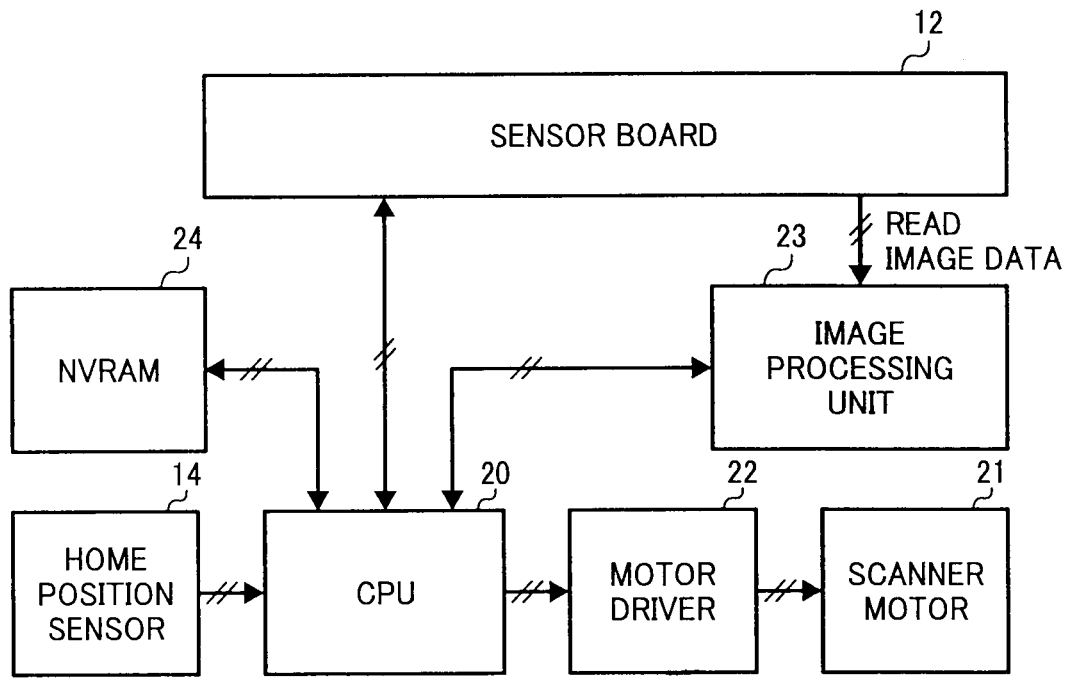
FIG. 3 is a block diagram illustrating a configuration of a control circuit included in an image reading device according to illustrative embodiments.

FIG. 3 is a block diagram illustrating a configuration of a control circuit included in an image reading device 1 according to illustrative embodiments. A CPU 20 serving as a control unit to control an image forming sequence and systems in the image reading device 1 also controls initialization such as homing and adjustment of signal characteristics or read images. Specifically, referring to FIG. 3, the CPU 20 controls a motor driver 22, a CCD 11 provided on a sensor board 12, an image processing unit 23, and an NVRAM 24. The motor driver 22 drives a scanner motor 21 for moving first and second carriages 4 and 5 each provided with an optical reading system including lamps and mirrors. The sensor board 12 includes the CCD 11 and black and white level control units thereon. The image processing unit 23 digitalizes image data read and sent by the sensor board 12. The NVRAM 24 stores data necessary for initialization. The CPU 20 receives a detection signal used for homing from a home position sensor 14. The image processing unit 23 applies image correction including shading, gamma correction, scaling, filtering, and so forth to the digitalized data of the image read and sent by the sensor board 12. The digitalized data to which the image correction is applied is then sent to a writing unit, not shown, to be output. Further, the image processing unit 23 detects black and white level data used for obtaining an adjusted value for clamp and gain correction performed by a signal processing unit, not shown, provided on the sensor board 12, based on the digitalized data of the image sent from the sensor board 12. Thereafter, the data thus detected is output to the CPU 20 for feedback. The scanner motor 21 includes a pulse motor (a stepping motor) driven by a driving pulse.

Figure 4:
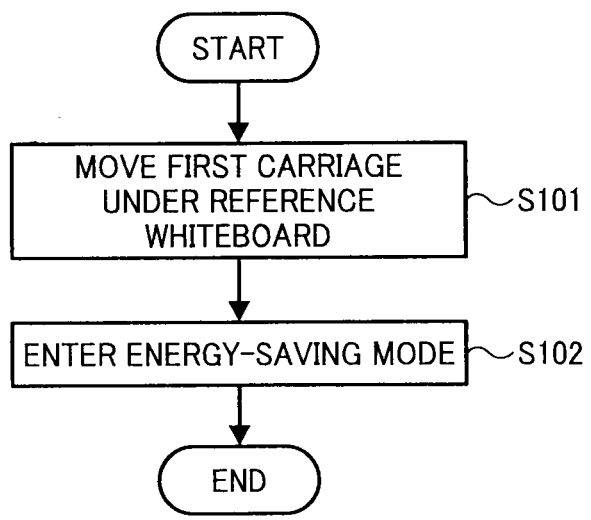
FIG. 4 is a flowchart illustrating a process to start an energy-saving mode performed by a CPU included in the image reading device according to illustrative embodiments.
Figure 5:
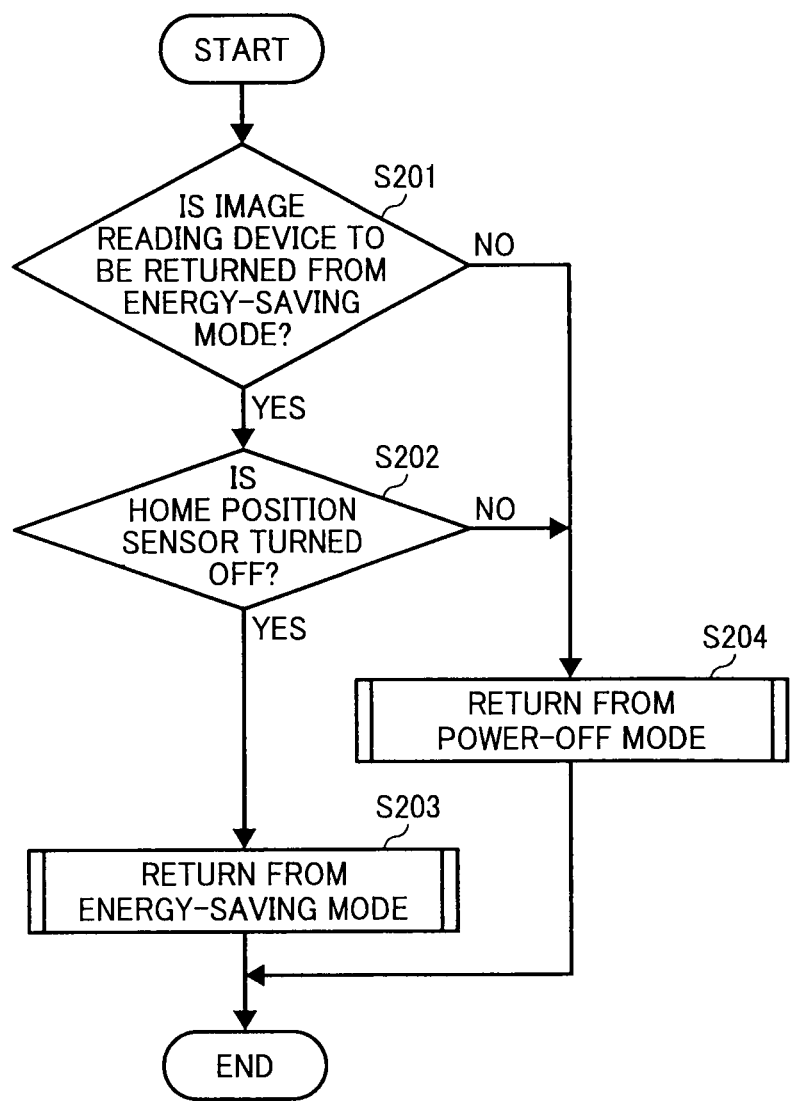
FIG. 5 is a flowchart illustrating a process to return the image reading device to an active mode from the energy saving mode according to illustrative embodiments.

FIG. 4 is a flowchart illustrating a process performed by the CPU 20 when the image reading device 1 enters the energy-saving mode. FIG. 5 is a flowchart illustrating a process to return the image reading device 1 to the active mode from the energy-saving mode.

Referring to FIG. 4, when the image reading device 1 is switched to the energy-saving mode, at S101, the first carriage 4 is moved under a reference whiteboard 3. Thereafter, at S102, the image reading device 1 enters the energy-saving mode. In other words, the first carriage 4 is moved under the reference whiteboard 3 immediately before the image reading device 1 enters the energy-saving mode.

Referring to FIG. 5, when the image reading device 1 is returned to the active mode from the energy-saving mode, at S201, the CPU 20 confirms whether or not the image reading device 1 is to be returned to the active mode from the energy saving mode. When the image reading device 1 is to be returned to the active mode from the energy-saving mode (YES at S201), at S202, the CPU 20 confirms whether or not the home position sensor 14 is turned off. When the home position sensor 14 is turned off (YES at S202), at S203, the image reading device 1 is returned to the active mode from the energy-saving mode. By contrast, when the home position sensor 14 is not turned off (NO at S202), at S204, the image reading device 1 is returned to the active mode from the power-off mode in the same way as the process illustrated in FIG. 2. Specifically, when the home position sensor 14 is turned on, it means that the first carriage 4 is positioned near a home position 13. Therefore, it is clear that the first carriage 4 is not positioned under the reference whiteboard 3. Accordingly, a process that is the same as that to return the image reading device 1 to the active mode from the power-off mode is performed.

Figure 6:
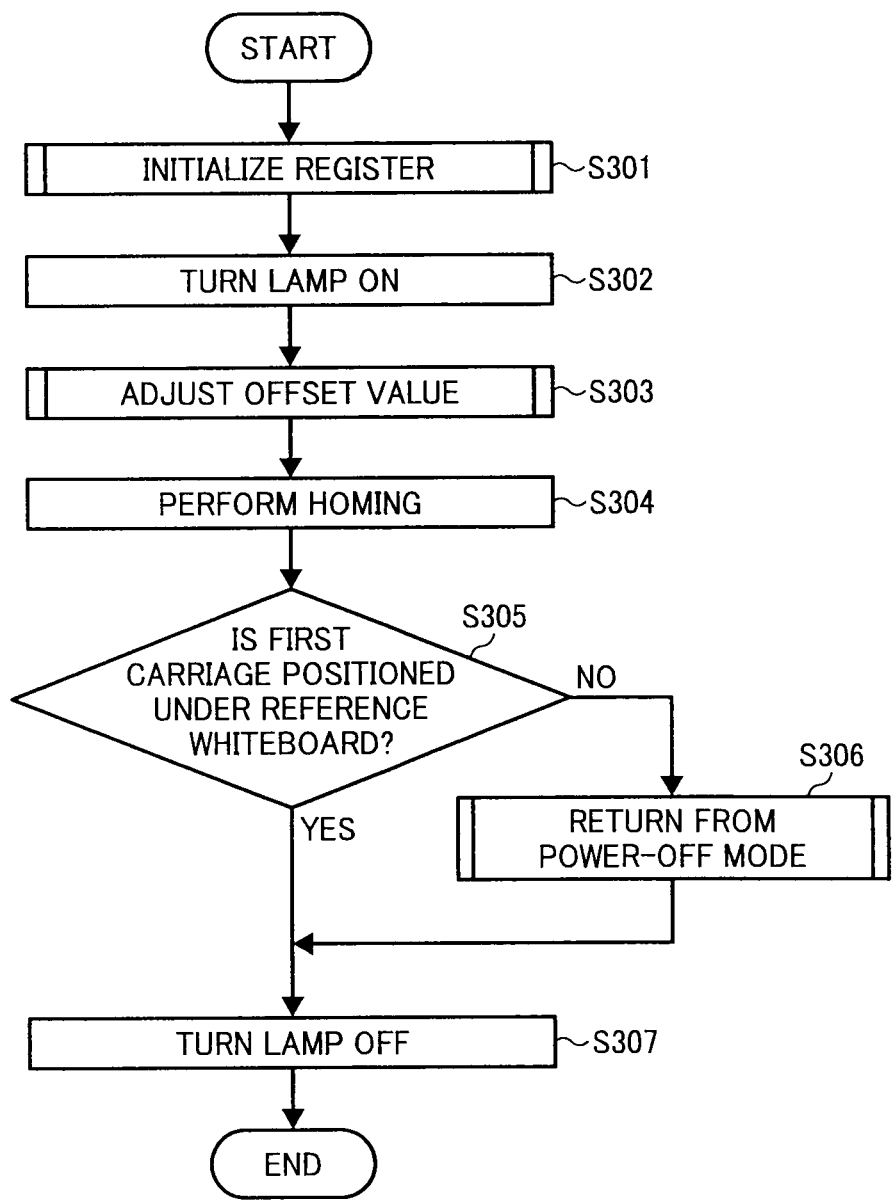
FIG. 6 is a flowchart illustrating a process to return the image reading device to the active mode from the energy-saving mode performed as a sub-sequence of S203 in the process illustrated in FIG. 5.

FIG. 6 is a flowchart illustrating a process to return the image reading device 1 to the active mode from the energy-saving mode performed as a sub-sequence of S203 in the process illustrated in FIG. 5. Because the first carriage 4 is positioned under the reference whiteboard 3 when the image reading device 1 is returned to the active mode from the energy-saving mode, at S301, the integrated circuit is initialized. Here, a register of the integrated circuit is initialized. At S302, a lamp 6 is turned on to read data from the reference whiteboard 3 and adjust a gain value to obtain a predetermined target value. Subsequently, at S303, an offset value is adjusted. In a similar way as adjustment of the gain value, the offset value is adjusted such that a black level reaches a predetermined target value.

Thereafter, at S304, homing is performed. At this time, a distance of movement of the first carriage 4 is accurately obtained by counting a pulse to the home position 13. The pulse is counted as follows: First, an initial value of a counter provided to the CPU 20 is obtained before the first carriage 4 is moved, and the initial value thus obtained is held as a variable POSCNTCK 1. Next, a counted value of the counter is obtained after homing is performed to move the first carriage 4 to the home position 13. The counted value thus obtained is held as a variable POSCNTCK 2. Then, a pulse during movement of the first carriage 4 is detected from a difference between the variables POSCNTCK 1 and POSCNTCK 2. Specifically, the pulse during the movement of the first carriage 4 is calculated by a formula DIFF_SPCNT=POSCNTCK 1−POSCNTCK 2. Thereafter, the distance of movement of the first carriage 4 during homing is calculated based on the pulse during the movement of the first carriage 4 thus obtained and an amount of movement of the motor per pulse, and at S305, the CPU 20 determines whether or not the first carriage 4 is positioned under the reference whiteboard 3. In other words, the CPU 20 determines whether or not the first carriage 4 is positioned under the reference whiteboard 3 based on the distance of movement of the first carriage 4 during homing thus calculated.

When the CPU 20 determines that the first carriage 4 is positioned under the reference whiteboard 3 (YES at S305), the process to return the image reading device 1 to the active mode from the energy-saving mode is completed. Accordingly, at S307, the lamp 6 is turned off to complete the process. By contrast, when the CPU 20 determines that the first carriage 4 is not positioned under the reference whiteboard 3 (NO at S305), the process proceeds to S306 to return the image reading device 1 to the active mode from the power-off mode in the same way as the process illustrated in FIG. 2.

Figure 2:
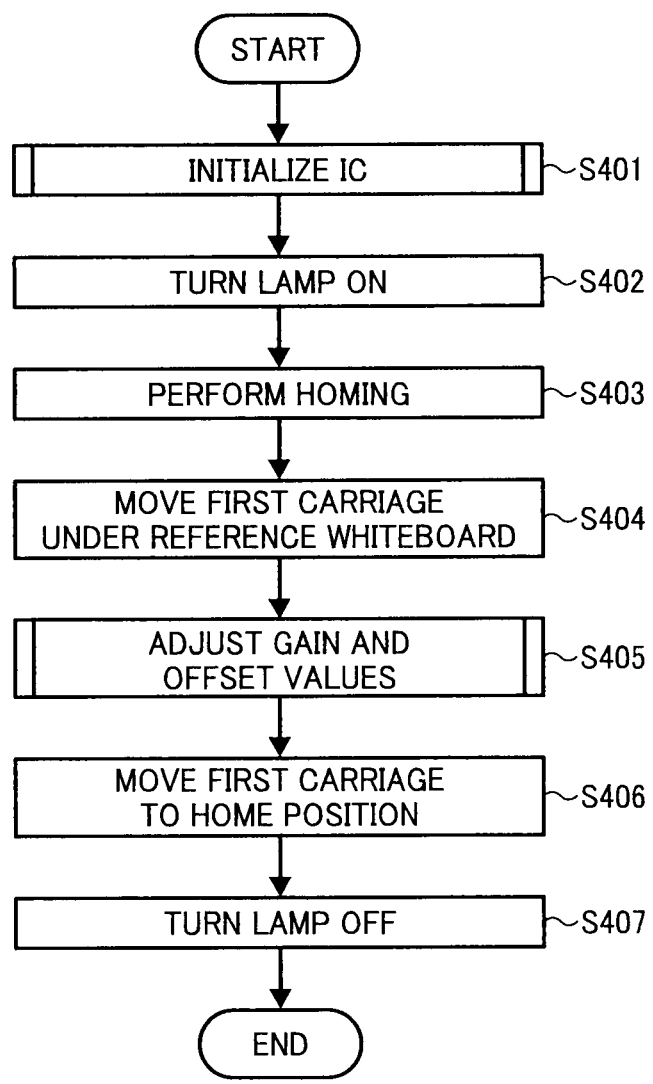
FIG. 2 is a flowchart illustrating a process to return the related-art image reading device to an active mode from a power-off mode or an energy-saving mode.

By returning the image reading device 1 to the active mode as illustrated in FIG. 6, the processes of S403 and S404 in FIG. 2 performed by the related-art image reading device can be omitted. As a result, the time required to return the image reading device 1 to the active mode from the energy-saving mode can be reduced. Further, even in a case in which the first carriage 4 is not positioned under the reference whiteboard 3 when the image reading device 1 is returned to the active mode from the energy-saving mode, the process to return the image reading device 1 to the active mode from the power-off mode is performed so that the adjusted values can be obtained by reading the reference whiteboard 3.

When further reduction of the time is demanded, the adjusted gain and offset values obtained at previous adjustment may be used. Although accuracy of the gain and offset values is slightly decreased, the time required to return the image reading device 1 to the active mode from the energy-saving mode can be reduced.

The image reading device 1 may be configured such that the user can select whether to return the image reading device 1 to the active mode from the power-off mode or to perform homing using the gain and offset values adjusted at previous adjustment in the case in which the first carriage 4 is not positioned under the reference whiteboard 3 when the image reading device 1 is returned to the active mode from the energy-saving mode. The selection may be performed through a control panel, not shown, provided to the image reading device 1, or a control panel provided to an image forming apparatus.

Although the image reading device 1 is described above as a scanner, the image reading device 1 according to the foregoing illustrative embodiments can be effectively applied to an image forming apparatus (such as a copier) including the scanner.

In the image reading device 1 according to the foregoing illustrative embodiments, the first carriage 4 is moved under the reference whiteboard 3 immediately before the energy-saving mode is activated. Accordingly, it is not necessary to perform homing and to move the first carriage 4 under the reference whiteboard 3 when the image reading device 1 is returned to the active mode from the energy-saving mode. As a result, the time required for returning the image reading device 1 to the active mode from the energy-saving mode can be reduced.

Even in a case in which the first carriage 4 is moved from under the reference whiteboard 3 due to an impact applied to the image reading device 1 during the energy-saving mode, the pulse of the motor is counted at homing after initialization so that the distance between the position of the first carriage 4 when initialization is performed and the home position 13 is reliably obtained. As a result, the time required for returning the image reading device 1 to the active mode from the energy-saving mode can be reduced even when the first carriage 4 is not positioned under the reference whiteboard 3.

The pulse of the pulse motor for moving the first carriage 4 is counted when the image reading device 1 is returned to the active mode from the power-off mode or the energy-saving mode, so that the position of the first carriage 4 is reliably obtained when the image reading device 1 is returned to the active mode.

Although the same process is performed when the image reading device 1 is returned to the active mode from the power-off mode and the energy-saving mode in the image reading device of the related-art, according to the foregoing illustrative embodiments, the different process is performed depending on whether the image reading device 1 is returned to the active mode from the power-off mode or the energy-saving mode. As a result, the time required for returning the image reading device 1 to the active mode from the energy-saving mode can be reduced.

Further, because the first carriage 4 is moved under the reference whiteboard 3 in advance when the image reading device 1 enters the energy-saving mode, the time required for returning the image reading device 1 to the active mode from the energy-saving mode can be reduced.

In the image reading device 1 according to the foregoing illustrative embodiments, the different process is performed when the image reading device 1 is returned from the power-off mode and the energy-saving mode. Specifically, when the image reading device 1 is returned to the active mode from the power-off mode, homing is performed first in a similar way as the image reading device of the related-art. By contrast, when the image reading device 1 is returned to the active mode from the energy-saving mode, it is not necessary to perform homing in the image reading device 1 according to the foregoing illustrative embodiments, so that the time required for returning the image reading device 1 to the active mode from the energy-saving mode can be reduced.

When the image reading device 1 is returned to the active mode from the energy-saving mode, the pulse to the home position 13 is counted. As a result, it can be reliably determined whether or not the first carriage 4 is positioned under the reference whiteboard 3 when the process to return the image reading device 1 to the active mode from the energy-saving mode is started.

In a case in which the first carriage 4 is not positioned under the reference whiteboard 3 when the image reading device 1 is returned to the active mode from the energy-saving mode, the same process to return the image reading device 1 to the active mode from the power-off mode is performed. Therefore, it is not necessary to add a new process for the above-described case.

Alternatively, in the case in which the first carriage 4 is not positioned under the reference whiteboard 3 when the image reading device 1 is returned to the active mode from the energy-saving mode, homing is performed using the previously adjusted gain and offset values, resulting in a reduction in the time required to return the image reading device 1 to the active mode from the energy-saving mode.

Elements and/or features of different illustrative embodiments may be combined with each other and/or substituted for each other within the scope of this disclosure and appended claims.

Illustrative embodiments being thus described, it will be apparent that the same may be varied in many ways. Such exemplary variations are not to be regarded as a departure from the spirit and scope of the present invention, and all such modifications as would be obvious to one skilled in the art are intended to be included within the scope of the following claims.

The number of constituent elements, locations, shapes and so forth of the constituent elements are not limited to any of the structure for performing the methodology illustrated in the drawings.

What is claimed is:

1. An image reading device, comprising:
   a first carriage including optical elements for reading an image of a document;
   a second carriage including optical elements for reading the image of the document;

a carriage driving unit including a pulse motor to move the first and second carriages;

a home position sensor to detect a home position of the first carriage;

a reference whiteboard to generate shading data and adjust a reference level to be read by the optical elements;

a control unit to control the first and second carriages, the carriage driving unit, the home position sensor, and the reference whiteboard to read the image of the document placed on a contact glass through the optical elements; and a counter to count a pulse of a pulse signal driving the pulse motor, wherein, the control unit is configured to switch between a first homing process and a second homing process based on a state of the home position sensor when the image reading device is returned to an active mode from an energy-saving mode, a direction of motion of the first carriage in the first homing process being opposite a direction of motion of the first carriage in the second homing process, and the control unit is configured to detect a distance of movement of the first carriage based on the pulse counted by the counter.

2. The image reading device according to claim 1, wherein the control unit changes an initialization sequence of the image reading device depending on whether the image reading device is returned to the active mode from the energy-saving mode or a power-off mode.

3. The image reading device according to claim 1, wherein the control unit detects the distance of movement of the first carriage based on the pulse counted by the counter to move the first carriage under the reference whiteboard when the image reading device enters the energy-saving mode.

4. The image reading device according to claim 1, wherein, when the image reading device is returned to the active mode from the energy-saving mode, the control unit initializes an integrated circuit, performs homing of the first carriage, determines whether or not the first carriage is positioned under the reference whiteboard during initialization of the integrated circuit, and completes return of the image reading device to the active mode from the energy-saving mode after confirming that the first carriage is positioned under the reference whiteboard.

5. The image reading device according to claim 4, wherein the control unit determines whether or not the first carriage is positioned under the reference whiteboard by calculating a distance of movement of the first carriage to the home position during homing based on a pulse of the pulse motor counted by the counter.

6. The image reading device according to claim 1, wherein the control unit moves the first carriage under the reference whiteboard when determining that the first carriage is positioned at the home position based on the result output from the home position sensor, and then moves the first carriage back to the home position after performing predetermined initialization to return the image reading device to the active mode.

7. The image reading device according to claim 1, wherein the control unit moves the first carriage under the reference whiteboard in a case of determining that the first carriage is not positioned under the reference whiteboard when the image reading device is returned to the active mode from the energy-saving mode, and then moves the first carriage to the home position after adjusting gain and offset values.

8. The image reading device according to claim 1, wherein the control unit moves the first carriage to the home position using gain and offset values adjusted at previous adjustment as an initial setting value in a case of determining that the first carriage is not positioned under the reference whiteboard when the image reading device is returned to the active mode from the energy-saving mode.

9. The image reading device according to claim 1, further comprising a selection unit to select whether to move the first carriage to the home position after moving the first carriage under the reference whiteboard and adjusting gain and offset values, or moving the first carriage to the home position using gain and offset values adjusted at previous adjustment as an initial setting value, in a case in which the first carriage is not positioned under the reference whiteboard when the image reading device is returned to the active mode from the energy-saving mode.

10. An image forming apparatus, comprising: the image reading device according to claim 1; and an image forming device to form an image on a recording medium based on an image read by the image reading device.

11. An image reading method for an image reading device, the device including a first carriage and a second carriage, each carriage containing optical elements for reading an image of a document; a carriage driving unit including a pulse motor to move the first and second carriages; a home position sensor to detect a home position of the first carriage; a reference whiteboard to generate shading data and adjust a reference level to be read by the optical elements; a control unit to control the first and second carriages, the carriage driving unit, the home position sensor, and the reference whiteboard to read the image of the document placed on a contact glass through the optical elements; and a counter to count a pulse of a pulse signal driving the pulse motor, the method comprising:

switching between a first homing process and a second homing process based on a state of the home position sensor when the image reading device is returned to an active mode from an energy-saving mode, a direction of motion of the first carriage in the first homing process being opposite a direction of motion of the first carriage in the second homing process; and detecting a distance of movement of the first carriage based on the pulse counted by the counter.

12. The image reading method according to claim 11, wherein, depending on whether the image reading device is returned to the active mode from the energy-saving mode or a power-off mode, the control unit changes an initialization sequence of the image reading device.

13. The image reading method according to claim 11, wherein, when the image reading device enters the energy-saving mode, the control unit detects the distance of movement of the first carriage based on the pulse counted by the counter to move the first carriage under the reference whiteboard.

14. The image reading method according to claim 11, wherein, when the image reading device is returned to the active mode from the energy-saving mode, the control unit initializes an integrated circuit, performs homing of the first carriage, determines whether or not the first carriage is positioned under the reference whiteboard during initialization of the integrated circuit, and completes return of the image reading device to the active mode from the energy-saving mode after confirming that the first carriage is positioned under the reference whiteboard.

15. The image reading method according to claim 14, wherein the control unit determines whether or not the first carriage is positioned under the reference whiteboard by calculating a distance of movement of the first carriage to the home position during homing based on a pulse of the pulse motor counted by the counter.

16. The image reading method according to claim 11, wherein the control unit, when determining that the first carriage is positioned at the home position based on the result output from the home position sensor, moves the first carriage under the reference whiteboard, and then moves the first carriage back to the home position after performing predetermined initialization to return the image reading device to the active mode.

17. The image reading method according to claim 11, wherein the control unit, in a case of determining that the first carriage is not positioned under the reference whiteboard when the image reading device is returned to the active mode from the energy-saving mode, moves the first carriage under the reference whiteboard, and then moves the first carriage to the home position after adjusting gain and offset values.

18. The image reading method according to claim 11, wherein the control unit, in a case of determining that the first carriage is not positioned under the reference whiteboard when the image reading device is returned to the active mode from the energy-saving mode, moves the first carriage to the home position using gain and offset values adjusted at previous adjustment as an initial setting value.

19. The image reading method according to claim 11, further comprising a selection step of selecting whether to move the first carriage to the home position after moving the first carriage under the reference whiteboard and adjusting gain and offset values, or move the first carriage to the home position using gain and offset values adjusted at previous adjustment as an initial setting value, in a case in which the first carriage is not positioned under the reference whiteboard when the image reading device is returned to the active mode from the energy-saving mode.

20. An image reading device, comprising:
a first carriage including optical elements for reading an image of a document;
a second carriage including optical elements for reading the image of the document;
carriage driving means for moving the first and second carriages;
home position sensing means for detecting a home position of the first carriage;
a reference whiteboard for generating shading data and adjusting a reference level to be read by the optical elements;
control means for controlling the first and second carriages, the carriage driving means, the home position sensing means, and the reference whiteboard to read the image of the document placed on a contact glass through the optical elements; and
counting means for counting a pulse of a pulse signal,
wherein the control means is configured to switch between a first homing process and a second homing process based on a state of the home position sensing means when the image reading device is returned to an active mode from an energy-saving mode, a direction of motion of the first carriage in the first homing process being opposite a direction of motion of the first carriage in the second homing process, and
the control means is configured to detect a distance of movement of the first carriage based on the pulse counted by the counting means.

* * * * *